United States Patent [19]

Speckhart et al.

[11] Patent Number: 5,269,402
[45] Date of Patent: Dec. 14, 1993

[54] APPARATUS FOR CONVEYING

[75] Inventors: Bernard Speckhart, Short Hills; Paul M. Berson, Mountain Lakes; Garri Akopnik, Newark, all of N.J.

[73] Assignee: White Conveyors, Inc., Kenilworth, N.J.

[21] Appl. No.: 716,776

[22] Filed: Jun. 18, 1991

Related U.S. Application Data

[63] Continuation-in-part of Ser. No. 643,776, Jan. 22, 1991, Pat. No. 5,154,275.

[51] Int. Cl.⁵ .................................................. B65G 47/24
[52] U.S. Cl. .................................. 198/416; 198/465.4; 198/680; 198/666; 198/670
[58] Field of Search .................... 198/465.4, 657, 666, 198/670, 662, 663, 673, 680, 416

[56] References Cited

U.S. PATENT DOCUMENTS

| | | | |
|---|---|---|---|
| Re. 24,961 | 4/1961 | Curtis | 198/465.4 X |
| 421,999 | 2/1890 | Williams | 198/673 |
| 1,861,600 | 6/1932 | Harrison . | |
| 1,998,109 | 4/1935 | Walter, Jr. | 211/1.5 |
| 2,449,669 | 9/1948 | Pohlers | 198/168 |
| 2,536,575 | 1/1951 | Seldin | 198/168 |
| 2,573,334 | 10/1951 | Hitz | 198/173 |
| 2,583,968 | 1/1952 | Rosseau | 263/6 |
| 2,599,615 | 6/1952 | Dahlberg | 198/673 X |
| 2,750,897 | 6/1956 | Davis | 104/96 |
| 2,751,091 | 6/1956 | Freeman | 214/11 |
| 2,846,049 | 8/1958 | Carlson | 198/130 |
| 2,861,676 | 11/1958 | Rasmussen et al. | 198/218 |
| 2,899,072 | 8/1959 | Weiss | 211/1.5 |
| 2,918,164 | 12/1959 | Austin et al. | 198/177 |
| 2,947,407 | 8/1960 | Wood | 198/66 |
| 2,982,351 | 9/1960 | Stone | 198/680 X |
| 2,987,170 | 6/1961 | Hamilton | 198/670 |
| 2,998,136 | 8/1961 | Gerisch | 209/122 |
| 3,113,675 | 12/1963 | Oda et al. | 198/25 |
| 3,124,236 | 3/1964 | Gerisch | 198/169 |
| 3,148,765 | 9/1964 | Weiss et al. | 198/213 |
| 3,151,730 | 10/1964 | Buenten | 198/38 |
| 3,164,245 | 1/1965 | Juengel | 198/129 |
| 3,171,536 | 3/1965 | Johnson | 198/465.4 |
| 3,178,012 | 4/1965 | Weiss et al. | 198/213 |
| 3,184,042 | 5/1965 | Rutkovsky et al. | 198/177 |
| 3,194,383 | 7/1965 | Kuwertz | 198/38 |
| 3,247,952 | 4/1966 | Kozlosky | 198/173 |

(List continued on next page.)

FOREIGN PATENT DOCUMENTS

| | | | |
|---|---|---|---|
| 334127 | 7/1933 | Canada | 203/17 |
| 690778 | 7/1964 | Canada | 186/11 |
| 726529 | 1/1966 | Canada | 198/22 |
| 1018472 | 10/1977 | Canada | 203/18 |
| 1018931 | 10/1977 | Canada | 203/18 |
| 1140139 | 11/1962 | Fed. Rep. of Germany . | |

OTHER PUBLICATIONS

Master-Veyor brochure, published by Speed Check Conveyor Co. Inc., Decatur, Ga., pp. 1-4.
Sorting Carousel brochure, published by Dunnewolt U.S.A. Inc., Dallas, Tx., pp. 1-4.
My-T-Veyor brochure, Model No. 830, published by My-T-Veyor, Oxford, Mich., pp. 1-3.
Sort-O-Veyor brochure, published by Speed Check Conveyor Co. Inc., Decatur, Ga., pp. 1-4.

(List continued on next page.)

*Primary Examiner*—D. Glenn Dayoan
*Attorney, Agent, or Firm*—Kenyon & Kenyon

[57] ABSTRACT

An apparatus for conveying articles supported on hooked members has a helical member which has a varying pitch and outer diameter for conveying the articles at different speeds along its length. The helical member is coupled on one end to a constant speed motor which rotates the helical member to convey the hooked members forward. The helical member is supported within a tube which includes an entrance portion shaped to rotate the hooked members in conjunction with an spring guide from a first position into a second position. A slot is formed within the support tube for receiving the hooked members from the entrance portion and maintaining the hooked members in the second position upon being conveyed by the helical member.

21 Claims, 10 Drawing Sheets

U.S. PATENT DOCUMENTS

| | | | |
|---|---|---|---|
| 3,403,767 | 10/1968 | Gerisch | 198/20 |
| 3,415,352 | 12/1968 | Gerisch | 198/38 |
| 3,422,950 | 1/1969 | Bachmann | 198/177 |
| 3,454,148 | 7/1969 | Harrison | 198/28 |
| 3,469,667 | 9/1969 | Gerisch | 193/40 |
| 3,511,359 | 5/1970 | Gerisch | 198/126 |
| 3,557,935 | 1/1971 | Gerisch | 198/38 |
| 3,581,887 | 6/1971 | Radutsky et al. | 209/73 |
| 3,622,000 | 11/1971 | McClenny | 209/121 |
| 3,684,078 | 8/1972 | Nielsen | 198/680 X |
| 3,707,925 | 1/1973 | Byrnes, Sr. | 198/465.4 X |
| 3,786,911 | 1/1974 | Milazzo | 198/219 |
| 3,917,112 | 11/1975 | Willis et al. | 221/1 |
| 3,942,340 | 3/1976 | Kirkby | 68/3 R |
| 3,961,699 | 6/1976 | Hirsch | 198/26 |
| 4,018,327 | 4/1977 | Goodman et al. | 198/723 |
| 4,027,598 | 6/1977 | Swilley | 104/162 |
| 4,036,365 | 7/1977 | Rosenfeld | 209/73 |
| 4,180,152 | 12/1979 | Sefcik | 198/680 X |
| 4,239,435 | 12/1980 | Weiss et al. | 414/136 |
| 4,875,416 | 10/1989 | Duce | 198/465.4 X |
| 4,943,198 | 7/1990 | McCabe | 414/13 |
| 4,977,996 | 12/1990 | Duce | 198/465.4 X |
| 4,995,531 | 2/1991 | Summers | 198/662 X |
| 5,000,309 | 3/1991 | Dooley | 198/680 |
| 5,154,275 | 10/1992 | Speckhart et al. | 198/680 X |

OTHER PUBLICATIONS

Quick Assembly brochure, published by Natmar, Inc., Cincinatti, Ohio pp. 1–2.

Controlling Hospital Garments, Wim Giezeman, Textile Rental, Jun. 1982, pp. 34–36, 38.

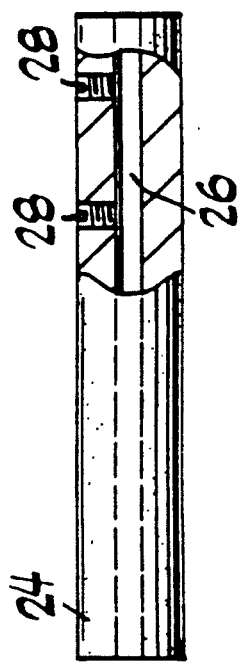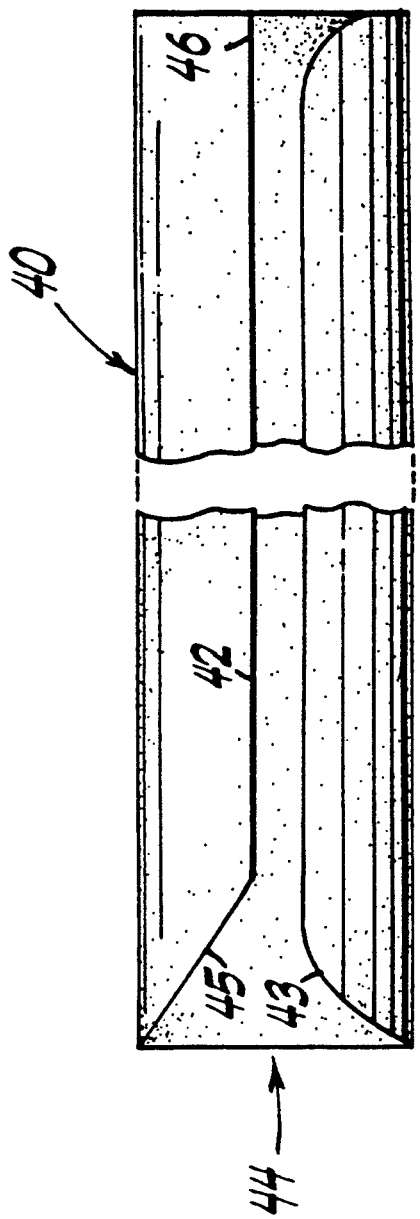

APPARATUS FOR CONVEYING

This application is a continuation-in-part of U.S. application Ser. No. 07/643,776, filed Jan. 22, 1991, now U.S. Pat. No. 5,154,275.

FIELD OF THE INVENTION

The present invention relates to apparatus and methods for conveying articles and, in particular, to apparatus and methods for conveying articles supported on hooked members.

BACKGROUND INFORMATION

Methods and apparatus for conveying articles and, in particular, articles supported on hooked members are used in various industries. For example, hooked members are frequently used to convey articles on an assembly line. The hooked members are each adapted to support an article and to hang from a conveying line. The articles are then moved along the conveying line, and either used or worked on in the assembly line.

Once each hooked member is placed on the conveying line, it is typically oriented in a fixed position. Since the hooked members and, thus, the articles are usually placed immediately next to each other on the conveying line in order to maximize the usage of space, it is typically not possible for an operator to view the sides of the articles facing each other. It is also typically not possible to rotate the hooked members or the articles relative to the conveying line while they are being conveyed, if necessary, for example, to view a normally hidden surface on an article. Typically, the manner in which the hooked members are seated on the conveying line prevents the hooked members and/or the articles from being rotated from one position into another relative to the conveying line while being conveyed.

In laundry and dry cleaning facilities, the articles, which are typically garments, are placed on hooked members, typically hangers, and the hangers are loaded onto a conveyor. In larger laundry and dry cleaning facilities, the garments are loaded onto a sorting conveyor in an unsorted order or sequence. There are several drop-off stations located at various points along the sorting conveyor. The garments are sorted by moving the sorting conveyor and unloading each garment into a respective drop-off station in a predetermined order. The sorted garments located in one or more drop-off stations are then loaded into trucks for delivery to the customers.

In order to sort the garments on the sorting conveyor, it is necessary to first identify each garment in the unsorted sequence of garments. With known conveying and sorting apparatus, however, it has been difficult to efficiently collect identifying information for each garment upon loading the garment onto a sorting conveyor, so that the garments can, in turn, be efficiently sorted into the drop-off stations.

Each garment typically includes a label displaying the necessary identifying information. If the garment has a collar, such as a shirt or jacket, then the label is typically located on an interior surface of the collar.

If, on the other hand, the garment has a waistline, such as a pair of trousers, then the label is typically located on an exterior surface of the waistline. The labels on the garments are then usually read by an operator and the identifying information is collected before each garment is placed on a conveyor. This is a tedious and time consuming procedure.

With known conveyors, the hangers are usually oriented substantially perpendicular to the axis of the conveyor. The labels on the garments therefore each typically face the garment located either immediately in front or behind the respective garment. It has not yet been possible to rotate either the hangers or the garments from one position into another relative to the conveyor while the garments are being conveyed, in order to view the labels.

The hangers are also typically conveyed at a relatively fast speed in order to quickly process the garments, particularly when there are large quantities of garments to be sorted. Since it has typically not been desirable to slow down the speed of the entire conveyor, it has also been difficult to accurately read the labels on the garments due to the relatively fast speed of conveyance of the hooked members.

SUMMARY OF THE INVENTION

The present invention is directed to an apparatus for conveying hooked members for supporting articles. The apparatus comprises a conveying member adapted to support and convey the hooked members. A positioning member is adapted to rotate each hooked member from a first position into a second position oriented at an angle relative to the first position upon conveyance by the conveying member.

In an apparatus of the present invention, the conveying member defines a helical surface adapted to receive the hooked members and to convey the hooked members toward one end of the conveying member upon rotation of the conveying member. The positioning member defines a positioning surface shaped to engage each hooked member upon conveyance by the conveying member. The positioning surface facilitates the rotation of each hooked member from the first position into the second position by contact therewith upon being conveyed by the conveying member. The positioning member further defines a slot extending therethrough and adapted to receive each hooked member. The slot maintains each hooked member in the second position upon being conveyed by the conveying member.

An apparatus of the present invention further comprises a shaft coupled to the conveying member, whereupon rotation of the shaft causes rotation of the conveying member. The shaft preferably includes, for example, a single helical groove adapted to receive the hooked members, and to convey the hooked members toward one end of the shaft upon rotation of the shaft. The apparatus preferably further comprises a helical coil having substantially the same pitch as the helical groove and coupled to the shaft adjacent to the helical groove. The helical coil is adapted to prevent the hooked members from being forced from the helical groove upon rotation of the shaft.

Another apparatus of the present invention comprises a helical member for supporting and conveying the hooked members upon being rotated, including a first portion for conveying the hooked members at a first speed and a second portion for conveying the hooked members at a second speed. A guide member is preferably supported adjacent to the helical member for rotating each hooked member from a first position into a second position oriented at an angle relative to the first position for conveyance by the helical member in the second position. The helical member preferably further includes a third portion between the first and second portions for gradually changing the speed of the hooked members from the first speed to the second speed upon conveyance by the helical member.

In an apparatus of the present invention, the speed of conveyance within the first and second portions of the helical member is controlled by selecting the pitch and outer diameter of the helical member within the respective portion. The first portion of the helical member preferably defines a first pitch and first diameter corresponding to the first speed of conveyance, and the second portion preferably defines a second pitch and second diameter corresponding to the second speed o conveyance.

The present invention is also directed to a method for conveying hooked members supporting articles, comprising the steps of: conveying the hooked members on a conveyor in a first position; and rotating the hooked members from the first position into a second position oriented at an angle relative to the first position while the hooked members are being conveyed on the conveyor.

A method of the present invention further comprises the step of conveying each hooked member along a rotating helical surface in the first and second positions. The method preferably further comprises the step of conveying each hooked member into sliding contact with a positioning surface to rotate each hooked member from the first position into the second position.

Another method of the present invention comprises the steps of: conveying each hooked member on a conveying member at a first speed for scanning the article supported on the hooked member; and conveying the hooked member at a second speed after scanning the article supported on the hooked member. The method preferably further comprises the step of rotating each hooked member from a first position into a second position oriented at an angle relative to the first position while conveying the respective hooked member for scanning the article supported on the hooked member in the second position.

One advantage of the apparatus and method of the present invention, is that because the hooked members are rotated from a first position into a second position upon being conveyed by the conveying member, the articles supported from the hooked members can be oriented in a position facilitating the reading of coded labels or other labels attached to the articles. Thus, the apparatus and method of the present invention can be employed to convey articles, such as garments, to a conveyor while simultaneously automatically reading coded labels or other types of labels attached to the garments.

Another advantage of the apparatus and method of the present invention, is that the hooked members can be conveyed at a first speed within a first portion of the helical member and at a second speed within a second portion of the helical member. The first speed can therefore be selected to be slower than the second speed, for example, to facilitate viewing the articles or scanning bar code labels attached to the articles while being conveyed within the first portion of the helical member.

Other advantages of the apparatus and method of the present invention will become apparent in view of the following detailed description and drawings taken in connection therewith.

BRIEF DESCRIPTION OF THE DRAWINGS

FIG. 3 is a partially cut-away, plan view of an adapter shaft of the apparatus of FIG. 1.

FIG. 4 is a bottom plan view of the support tube of the apparatus of FIG. 1.

DETAILED DESCRIPTION

Figure 1:
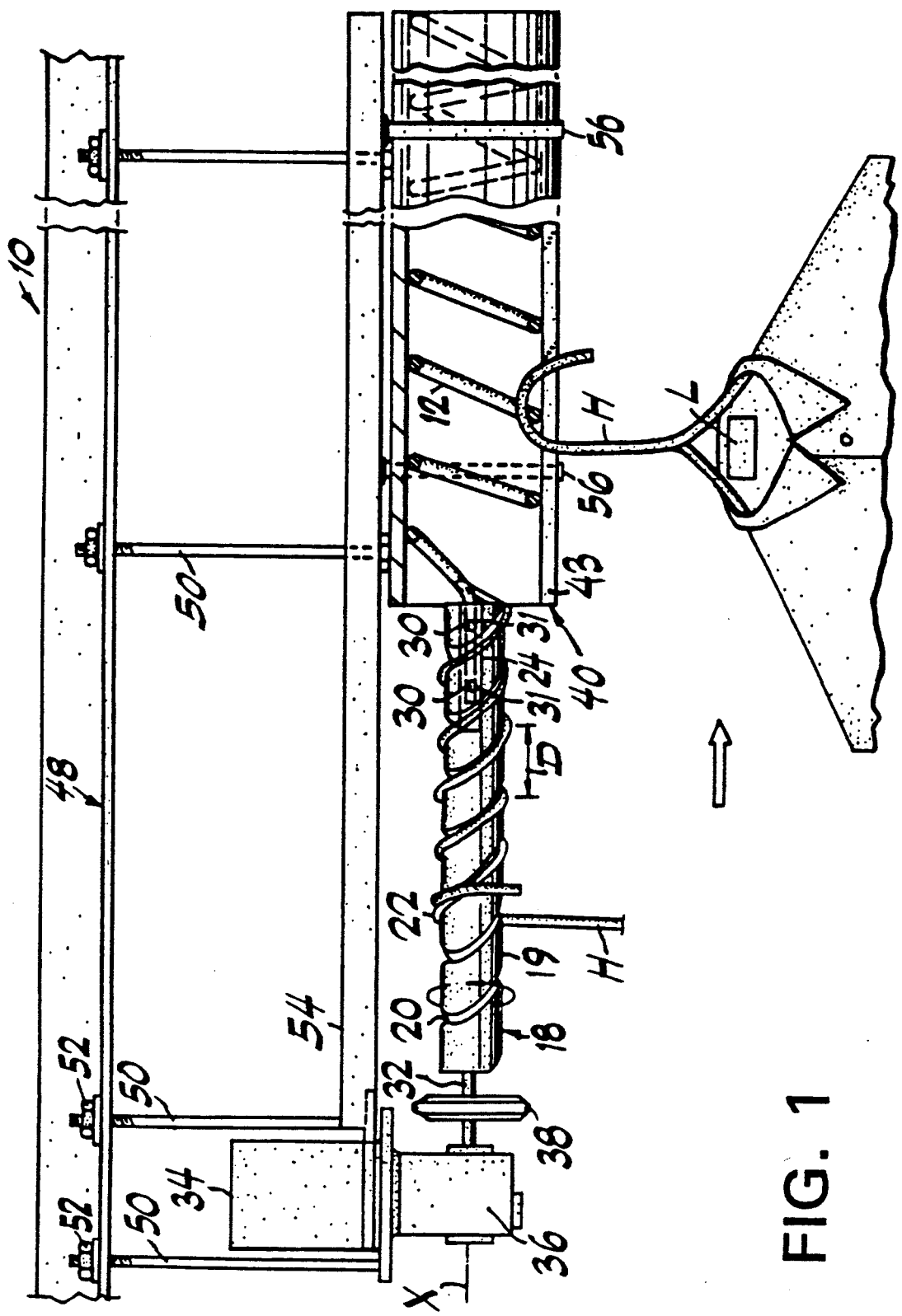
FIG. 1 is a front plan view of an apparatus embodying the present invention for conveying hooked members supporting articles.

In FIG. 1, an apparatus embodying the present invention for conveying hooked members for supporting articles, is indicated generally by the reference numeral 10. In the example illustrated, the apparatus 10 is used to convey garments supported on hangers H, typically in a laundry or dry cleaning facility. It should be pointed out, however, that the apparatus and method of the present invention are equally adapted for conveying any of numerous other types of hooked members and articles in other types of facilities.

Figure 2:
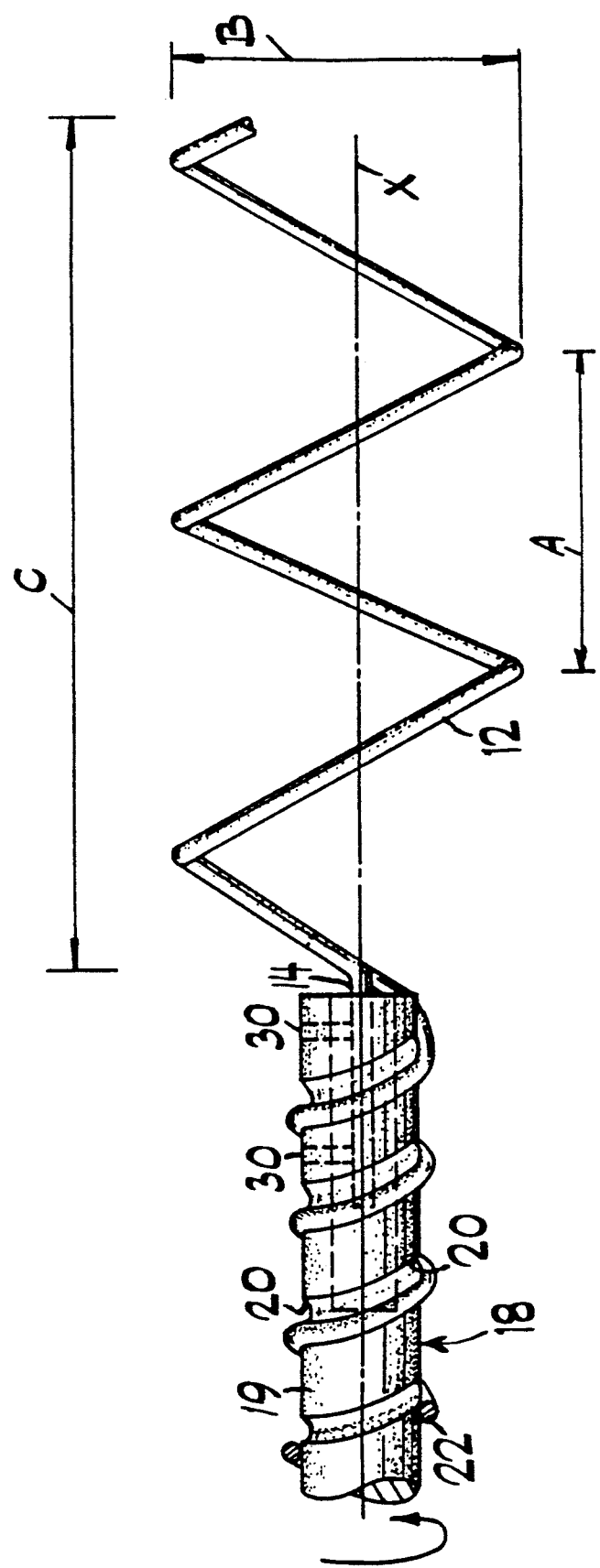
FIG. 2 is a partial, further detailed plan view of the helical member and conveying shaft of the apparatus of FIG. 1.

The apparatus 10 comprises a helical member 12, which is shown in further detail in FIG. 2. The helical member 12 is made by winding a hardened flexible steel wire, such as "music wire", into a generally helical shape. The helical member 12 defines a pitch A, an outside diameter B, a helical portion C (shown partially in FIG. 2), and a straight portion 14 on one end.

In order to facilitate the winding operation, the pitch A preferably does not exceed the diameter B. In the embodiment of the present invention illustrated, the wire is about ¼ of an inch in diameter, the pitch A is about 3.5 inches, the diameter B is also about 3.5 inches, and the length of the helical portion C is about 48 inches. As will be recognized by those skilled in the art, however, these dimensions are only exemplary, and can be changed as necessary to meet the space and conveying requirements of any conveying system. As shown in FIG. 2, the helical member 12 defines an axis of rotation X, and the axis of the straight portion 14 is substantially coincident with the axis X.

The apparatus 10 further comprises a conveying shaft 18 coupled on one end to the straight portion 14 of the helical member 12. The conveying shaft 18 defines a substantially cylindrical exterior surface 19, and a single helical groove 20 formed within the surface 19. The helical groove 20 defines a pitch D and extends substantially from one end of the conveying shaft 18 to the other. In the embodiment of the present invention illustrated, the pitch D is approximately 1.3 inches which, however, is purely exemplary, and can be changed as desired.

A helical coil 22, which also has a pitch D and, thus, is substantially the same as the pitch of the helical groove 20, is coupled to the shaft 18 immediately behind the helical groove, as shown in FIGS. 1 and 2. The helical coil 22 follows the helical groove 20 and extends beyond the end of the shaft 18 and is coupled on its free end to the helical member 12, as shown in FIG. 2. Although the helical member 12 and helical coil 22 are illustrated as separate components, they can equally be fabricated as integral components. For example, a single wire can be wound to form both the helical coil 22 and helical member 12. In this case, the helical member 12 would not include the straight portion 14.

When the hooked end of a hanger H is placed onto the rotating shaft 18, the rotation of the shaft causes it to fall into the helical groove 20, as shown in FIG. 1. The coil 22 in turn prevents the hanger H from slipping out of the groove 20. As the shaft 18 is rotated, the hanger H is moved along the length of the shaft within the groove 20, conveyed off the end of the shaft 18, and over the end of the helical coil 22 onto the helical member 12. The hanger H is then conveyed along the length of the helical member 12 upon rotation of the helical member, as is described further below.

The apparatus 10 further comprises an adapter shaft 24 inserted in one end of the shaft 18, as illustrated in dashed lines in FIG. 1. As shown in FIG. 3, the adapter shaft 24 is substantially cylindrical, and includes an aperture 26 extending through the shaft in the axial direction. In the embodiment of the present invention illustrated, the diameter of the aperture 26 is equal to about ¼ of an inch, which, however, is purely exemplary. The aperture 26 is therefore adapted to receive the straight portion 14 of the helical member 12, as shown in FIGS. 1 and 2. The adapter shaft 24 further defines two threaded apertures extending between the outside surface of the shaft and the aperture 26, as illustrated in FIG. 3. The threaded apertures are adapted to receive set screws 28 to secure the straight portion 14 of the helical member 12 within the adapter shaft 24, as shown in FIGS. 1 and 2.

The shaft 18 also includes a pair of threaded apertures 30 extending through the cylindrical surface 19, as illustrated in dashed lines in FIG. 2. Each threaded aperture 30 is adapted to receive a set screw 31, as shown in FIG. 1. Thus, the adapter shaft 24 is secured within the end of the shaft 18 by the set screws 31, and the straight portion 14 is, in turn, secured to the adapter shaft 24 by the set screws 28.

As shown in FIG. 1, a drive shaft 32 is coupled to the end of the shaft 18. The other end of the drive shaft 32 is rotatably driven by a motor 34 through a gear reducer 36 and a clutch 38. In the embodiment of the present invention illustrated, the motor 34 is an AC drive motor which runs at approximately 1,725 rpm, and the gear reducer 36 provides a gear ratio of approximately 5:1. Therefore, the drive shaft 32 and, thus, the conveying shaft 18 and helical member 12 turn at approximately 345 rpm. Accordingly, if the hangers H loaded onto the apparatus 10 are spaced about 21 inches apart, the apparatus 10 should deliver the garments at a conveying speed of about 1 garment per second. As will be recognized by those skilled in the art, however, the type of motor 34, its speed of operation, and its gear ratio, along with the dimensions of the conveying shaft 18, helical coil 22 and helical member 12, can be changed to obtain any desired conveying speed.

The apparatus 10 further comprises a hollow support tube 40, which is adapted to receive the helical member 12, as shown in FIG. 1. The support tube 40 both supports the helical member 12 and substantially prevents someone, such as an operator, from bumping into or otherwise interfering with the operation of the helical member 12. The support tube 40 defines a slot 42 extending through the bottom portion substantially parallel with the axis X, as shown in FIG. 4. The width of the slot 42 is dimensioned to receive the hooked end and/or the neck portion of a hanger H to permit the hanger to slide through the slot, as shown in FIG. 1. The support tube 40 further defines an entrance portion 44 on one end of the slot 42 and an exit portion 46 on the other end of the slot, as shown in FIG. 4.

The entrance portion 44 is adapted to receive each hanger H as it is conveyed from the conveying shaft 18 onto the rotating helical member 12. The entrance portion 44 is shaped so that when the hooked end of a hanger H contacts the entrance portion, it causes the hanger H to rotate about 90° upon being conveyed therethrough. When the hangers H are supported within the helical groove 20 of the conveying shaft 18, each hanger H is oriented in a first position wherein the plane of each hanger is oriented at an angle relative to the axis X. As shown in FIG. 1, the angle is determined by the shape of the helical groove 20 and is nearly 90°. However, as the hangers H are conveyed onto the rotating helical member 12, they are rotated from the first position into a second position substantially parallel or in line with the axis X, as also shown in FIG. 1.

As shown in FIG. 4, the entrance portion 44 is defined by a first surface 43 and a second surface 45. Both the first and second surfaces 43 and 45, respectively, extend between the entrance end of the support tube 40 and a respective side of the slot 42. As shown in FIG. 4, the second surface 45 is located further away from the entrance end of the support tube 40 than is the first surface 43. The second surface 45 thus meets the slot 42 at a point further away from the entrance end than does the first surface 43. As each hanger H is conveyed forward into the entrance portion 44, the first surface 43 contacts the hanger H and, in turn, causes it to begin to rotate from the first position into the second position. For purposes of explanation, in the hanger H shown supported on the helical member 12 in FIG. 1, the back side of the hooked end is the left side when facing the drawing, and the front side of the hooked end is the right side when facing the drawing.

As the hanger H is conveyed forward by the rotating helical member 12, the back side of the hooked end of the hanger H slides against the first surface 43 and the front side of the hooked end is simultaneously rotated by the second surface 45 and into the slot 42. If the front side of the hooked end of the hanger H contacts the second surface 45, the shape of the second surface facilitates the insertion of the front side into the slot 42. Then, once the entire hooked end of the hanger H is located within the slot 42, the hanger is maintained in the second position substantially parallel to the axis X as it is conveyed through the slot 42 by the helical member 12. As shown in FIG. 4, the exit portion 46 defines a curved surface on one side of the slot 42 to facilitate the release of the hangers H from the helical member 12 and the support tube 40.

One advantage of the apparatus and method of the present invention, therefore, is that the position of the hangers H and, thus, the position of the garments supported on the hangers H can be controlled while being conveyed. Accordingly, if it is necessary to view, for example, a label located within the collar of a garment while the garment is being conveyed, such as the label L shown in FIG. 1, the label can easily be viewed from the side of the apparatus 10. In prior conveying systems, on the other hand, such a label would typically face the garment located immediately in front or behind the garment and, thus, could not easily be viewed while being conveyed.

As will be recognized by those skilled in the art, the exact dimensions of the first surface 43, the second surface 45, and the slot 42 will vary depending upon the dimensions of the other components of the apparatus 10. It will be well within the knowledge of those skilled in the art, however, to determine the exact dimensions necessary to cause the entrance portion 44 to rotate each hanger H from a first position into a second position while being conveyed.

The apparatus 10 is adapted to be coupled to a ceiling support 48 of a dry cleaning or laundry facility, as shown in FIG. 1. A plurality of threaded rods 50 are each coupled on one end to the ceiling support 48 by a respective fastener 52 and project downwardly from the ceiling support, as shown in FIG. 1. The other end of each threaded rod 50 is coupled to a support plate 54. As shown in FIG. 1, the motor 34 is mounted on one end of the support plate 54, and suspended on the other side from the ceiling support 48 by threaded rods 50. The support tube 40 is also supported from the support plate 54 by several brackets 56 spaced apart from each other in the axial direction of the support tube, as shown in FIG. 1. Each bracket 56 includes a gap (not shown) corresponding in position to the slot 42 to permit the hangers H to pass freely through the slot. It should be pointed out that the ceiling support 48 is purely exemplary, and the apparatus 10 can equally be mounted on another type of structure supported, for example, on a floor or wall.

In the operation of the apparatus and method of the present invention, the motor 34 is operated to rotatably drive the drive shaft 32 and, in turn, the conveying shaft 18 and helical member 12. The hooked ends of the hangers H are placed within the helical groove 20 of the conveying shaft 18. As the conveying shaft 18 is rotated, the hangers H are moved forward in the direction of the arrow in FIG. 1, and the helical groove 20 and helical coil 22 cause each hanger H to be maintained in the first position, as shown in FIG. 1.

Then, when each hanger H reaches the end of the shaft 18, it slides over the end of the helical coil 22 and onto the rotating helical member 12. While the hangers H are conveyed through the entrance portion 44 of the tube 40, the hooked end of each hanger H contacts and, thus, is driven by the helical member 12 against the first surface 43. The shape of the first surface 43 causes each hanger H to be rotated approximately 90° from the first position into the second position, as shown in FIG. 1. As can be seen, both the front and back sides of the hooked end of each hanger H extend through the slot 42 and, thus, each respective hanger H is maintained in the second position while being conveyed through the slot 42. Once each hanger H reaches the end of the support tube 40, the hangers H are then released from the helical member 12 and through the exit portion 46 onto, for example, another conveyor or receiving rail (not shown).

One advantage of the apparatus and method of the present invention, is that if a shirt, for example, is placed on a hanger H, a label L attached to the inside portion of the collar can be viewed when the hanger H is conveyed through the slot 42 of the tube 40, as shown in FIG. 1. Likewise, if a pair of trousers or similar type of garment (not shown) is placed on a hanger H, a label L attached to the waistline of the garment can be viewed when the garment is conveyed through the slot 42 of the tube 40. Accordingly, because the garments are rotated from a first position into a second position, the labels attached to the garments can be rapidly and reliably read upon being conveyed on the apparatus 10.

The apparatus and method of the present invention is therefore particularly suited for conveying garments with coded labels attached to the garments. A scanning device (not shown) can be located on one side of the apparatus 10 and oriented so that when the hangers H are conveyed along the helical member 12, the scanning device can read the identifying information on each respective coded label. The identifying information can, in turn, be transmitted to a computer control system (not shown) for subsequently sorting the garments on, for example, a sorting conveyor. Preferably, if the garment is a shirt or jacket, the coded label is located on the inside surface of the collar. If, on the other hand, the garment is a pair of trousers, the coded label is preferably located on an outside surface on the waistline. In this way, when the hangers H are oriented in the second position on the helical member 12, as shown in FIG. 1, the coded labels on the garments can be quickly and reliably read by a scanning device.

Figure 5A:
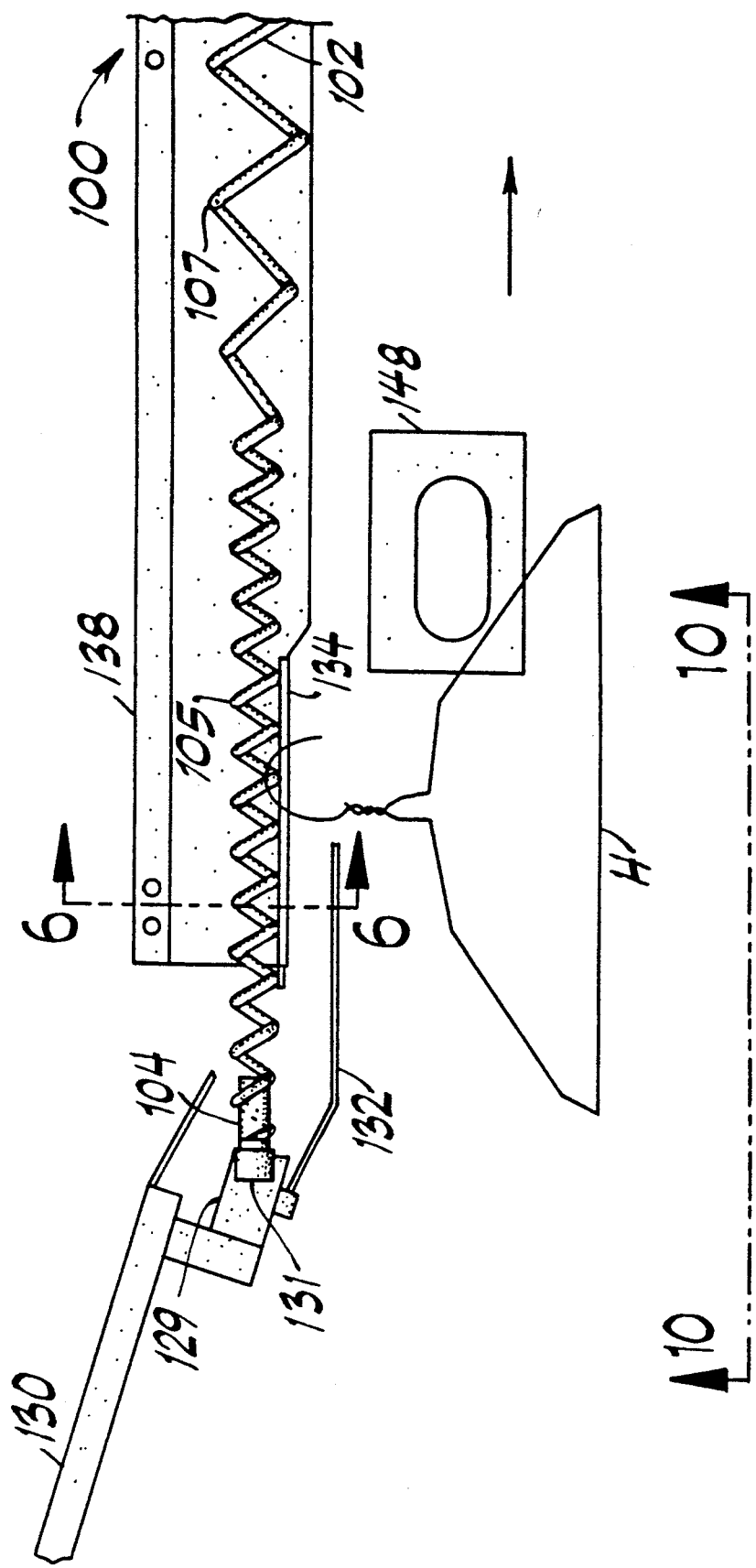
FIG. 5 is a side plan view of another apparatus embodying the present invention for conveying hooked members supporting articles.
Figure 5B:
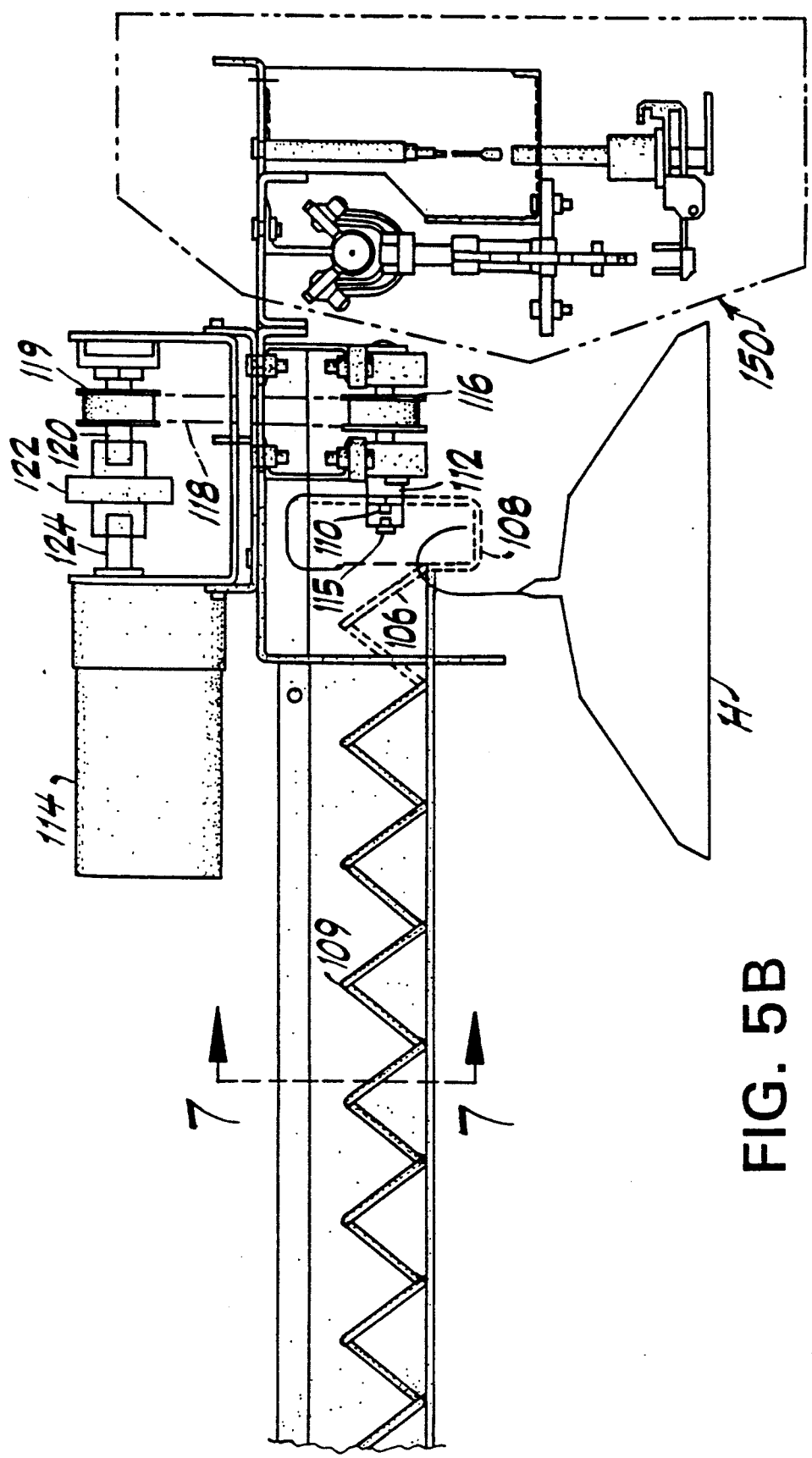

In FIG. 5, another apparatus embodying the present invention for conveying hooked members for supporting articles is indicated generally by the reference numeral 100. In the example of the present invention illustrated, the hooked members are hangers H used to convey garments (not shown) typically in a laundry or dry cleaning facility. As will be recognized by those skilled in the art, however, the apparatus 100 is equally adaptable to convey numerous other types of hooked members for supporting other types of articles.

Figure 8:
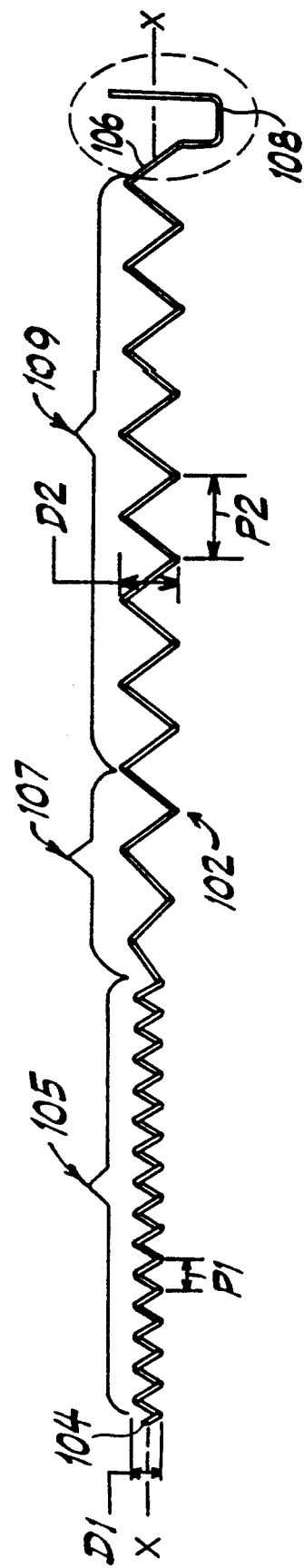
FIG. 8 is a plan view of the helical member of the apparatus of FIG. 5.

The apparatus 100 comprises a helical member 102, which is shown in further detail in FIG. 8. The helical member 102 is fabricated by winding a hardened flexible steel wire, such as "music wire", into a generally helical shape. As shown in FIG. 8, the helical member 102 defines an axis of rotation X, and is fabricated so that its pitch and diameter varies along its length in the direction of the axis X. Starting at a loading end 104, the helical member 102 defines a first portion 105 which is approximately 18 inches long and formed with a pitch P1 of approximately 1.30 inches, and an outside diameter D1 of approximately 1.25 inches. Next, there is a second transition portion 107 approximately 6 inches long in the direction of the axis X, in which the pitch and diameter of the helical member 102 vary in a substantially linear manner along the axis X, as shown in FIG. 8. A third portion 109, located on the other side of the second transition portion 107, is approximately 30 inches long, and has a pitch P2 of approximately 2.7 inches and an outside diameter D2 of approximately 2 9/16 inches. As shown in FIG. 8, the pitch and diameter of the second transition portion 107 increases from the pitch P1 and outside diameter D1 on one end, to the pitch P2 and outside diameter D2 on the other end. In the embodiment of the present invention illustrated, the diameter of the wire of the helical member 102 is approximately 0.22 inch. As will be recognized by those skilled in the art, however, the dimensions described herein are only exemplary, and can be changed as necessary to meet the space and conveying requirements of a particular conveying system.

A J-shaped hook 108 ("J-hook") is coupled to the driving end 106 of the helical member 102. The free end of the J-hook 108 is inserted within a hole 110 extending through a shaft 112, as shown in FIG. 5, and is coupled to the shaft 112 by a set screw 115. The shaft 112 is coupled to a motor 114, and is aligned parallel to the rotational axis X of the helical member 102. The motor 14 is preferably a constant speed motor, but as will be recognized by those skilled in the art can equally be a variable speed motor. As shown in FIG. 5, a first pulley 116 is coupled to the shaft 112, and a continuous belt 118 couples the first pulley 116 to a second pulley 119. The second pulley 119 is coupled to a second shaft 120, which is in turn coupled to a clutch 122. The clutch 122 is coupled to an output shaft 124 of the constant speed motor 114.

Figure 9:
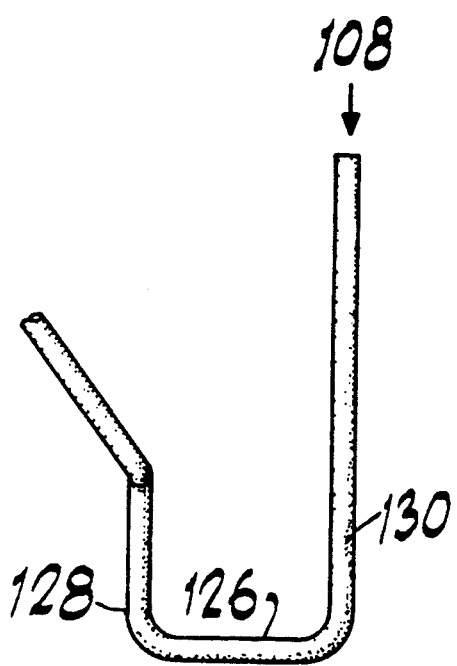
FIG. 9 is a magnified view of the J-hook of the helical member taken within the circle of FIG. 8.

As shown in FIG. 9, the J-hook 108 comprises a horizontal member 126 extending between a first vertical member 128 and a second vertical member 130. In the embodiment of the present invention illustrated, the horizontal member 126 is approximately 2.25 inches long, the first vertical member 128 is approximately 1.75 inches long, and the second vertical member 130 is approximately 3.75 inches long. These dimensions are only exemplary, however, and as will be recognized by those skilled in the art can be changed as required. The J-hook 108 can be formed as an integral part of the helical member 102, for example, by bending the end of the helical member 102 into the J-hook shape, as shown in FIGS. 8 and 9. Alternatively, the J-hook 108 can be fabricated separately and then coupled to the helical member 102, for example, by welding the first vertical member 128 to the end of the helical member 102.

Figure 6:
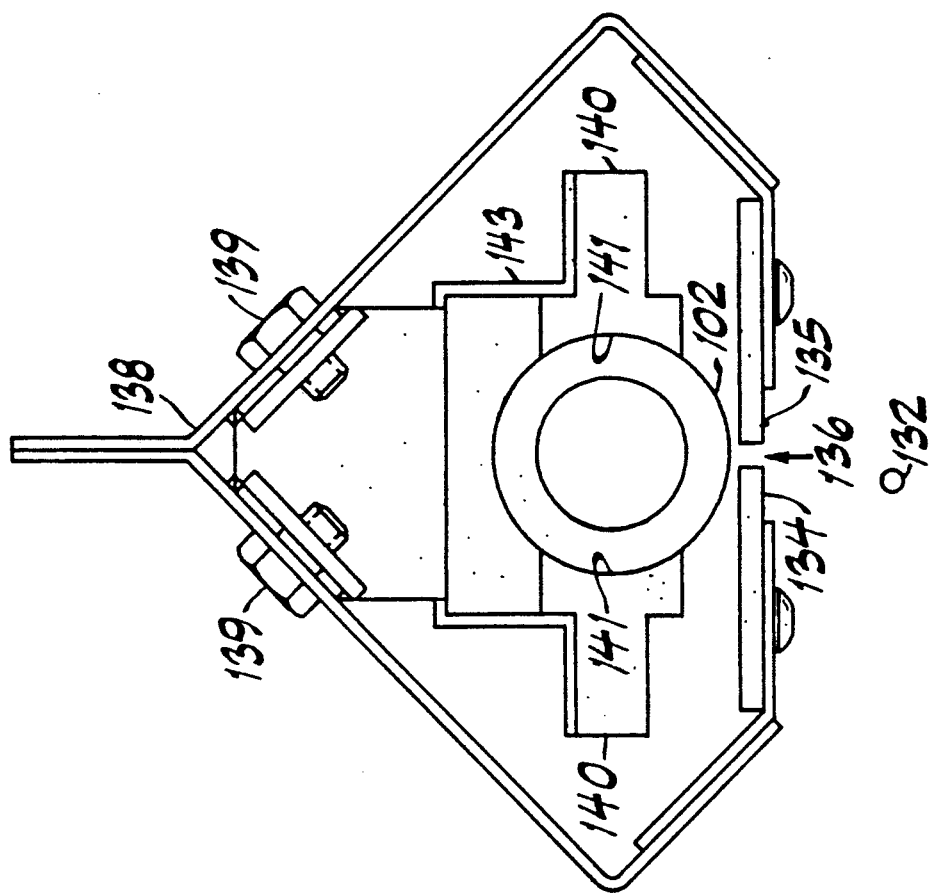
FIG. 6 is a cross-sectional view taken along the line 6—6 of FIG. 5.
Figure 10:
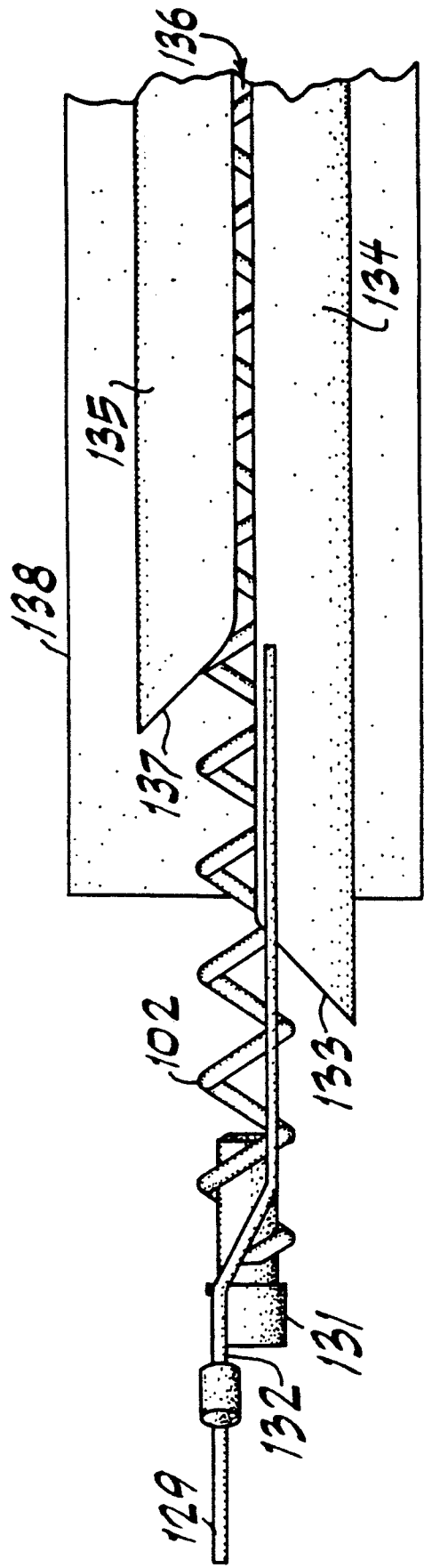
FIG. 10 is a bottom plan view taken along the line 10—10 of FIG. 5 illustrating the spring guide and the hanger guides of the apparatus in further detail.

As illustrated in FIGS. 6 and 10, a first hanger guide 134 and a second hanger guide 135 are supported beneath the helical member 102. The first hanger guide 134 and second hanger guide 135 are positioned relative to each other so that a longitudinal slot 136 is formed between the two hanger guides and extends parallel to the axis X, as shown in FIG. 10. The first hanger guide 134 defines a first leading edge 133 oriented at an acute angle relative to the axis X for contacting and facilitating the rotation of each hanger H. The second hanger guide 135, on the other hand, defines a second leading edge 137 located downstream of the first leading edge 133 and which is substantially the mirror image of the first leading edge. The second leading edge 137 facilitates the insertion of the hooked end of each hanger H into the slot 136.

Figure 7:
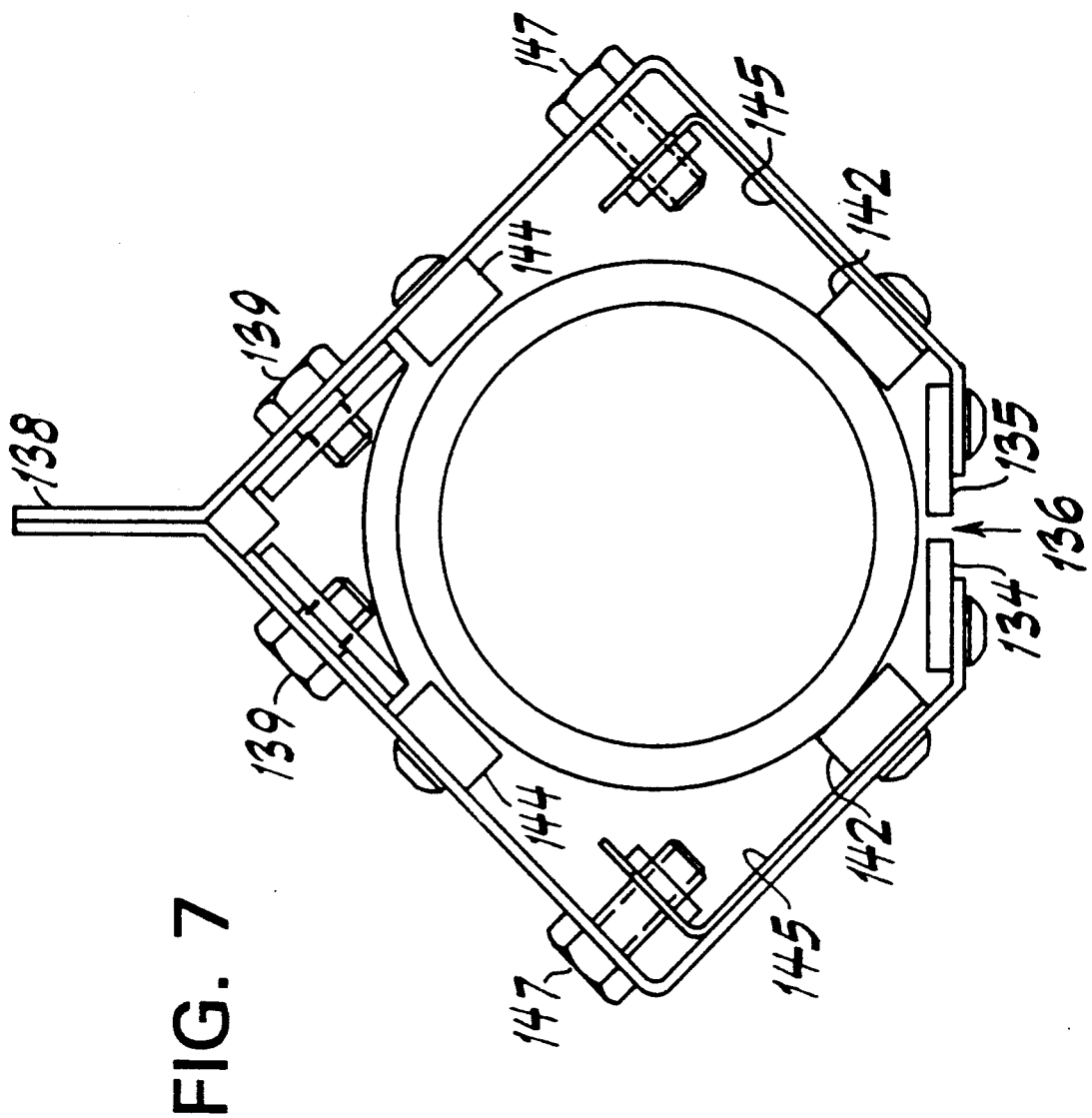
FIG. 7 is a cross-sectional view taken along the line 7—7 of FIG. 5.

An indexing device 130, as shown in FIG. 5 in dashed lines, is supported above the loading end 104 of the helical member 102 for indexing the hangers H one at a time onto the helical member. The indexing device 130 is preferably a type known to those skilled in the art, such as the "Auto-Feeder" indexing device manufactured by Fremar, Inc. of Lynnwood Wash. A support plate 129 is coupled to the end of the indexing device 130, and a spring entrance guide 131 is in turn coupled to the support plate 129. The free end of the spring entrance guide 131 is plug shaped and is inserted within the loading end 104 of the helical member 102. The helical member 102 thus rotates relative to the spring entrance guide 131, which otherwise constrains the movement of the helical member and maintains its concentricity about the axis X. A spring guide 132 is coupled to the bottom of the support plate 129 and is formed by a flexible bar extending beneath the loading end 104 of the helical member 102 and substantially parallel to the axis X, as shown in FIGS. 5 and 10. As shown in FIGS. 6 and 7, a sheet metal tube 138 is coupled to the hanger guides 134 and 135 and forms an enclosure substantially surrounding the helical member 102.

As shown in FIG. 5, two hangers H for supporting garments (not shown) are shown being conveyed in the direction of the arrow on the helical member 102. Each hanger H is initially conveyed by the indexing device 130 onto the first portion 105, where the hanger is received within the windings of the helical member and oriented in a first position substantially perpendicular to the axis X. The hooked end of each hanger H simultaneously straddles both the helical member 102 and the spring guide 132 as the hanger is conveyed in the direction of the arrow in FIG. 5. Then, when the hanger H contacts the leading edge 133 of the first hanger guide 134, the closed side of the hooked end of the hanger is forced between the spring guide 132 and the leading edge 133, thus causing the hanger to rotate from the first position into a second position substantially parallel to the axis X. The hanger is then conveyed forward in the second position and received within the slot 136 which maintains the hanger H in the second position.

As shown in FIG. 6, a pair of first guides 140 are each supported within the sheet metal tube 138 on either side of the first portion 105 of the helical member 102. Each first guide 140 defines an approximately T-shaped cross-section and includes a curved surface 141 for receiving the windings of the helical member 102 to guide the helical member upon rotation about the axis X. As shown in FIG. 6, the two first guides 140 are coupled to a bracket 143, which is in turn coupled to the sheet metal tube 138 by fasteners 139.

As shown in FIG. 7, two second guides 142 are each supported on an inside surface of the sheet metal tube 138 on either side of the first and second hanger guides 134 and 135, and in contact with the third portion 109 of the helical member 102. Two third guides 144 are coupled to an inside surface of the sheet metal tube 138, each located directly above a respective second guide 142, as shown in FIG. 7. The second guides 142 and third guides 144 each contact an opposite side of the helical member 102 relative to the other to support and guide the helical member 102 upon rotation about the axis X. Each of the guides 140, 142, and 144 are preferably formed of a plastic material and extend partially along the inside of the sheet metal tube 138 substantially parallel to the axis X, and thus maintain the axis X of the helical member 102 concentric with the center of the sheet metal tube 138 during rotation of the helical member. As shown in FIG. 7, each second guide 142 is coupled to a respective support member 145, which is in turn coupled to the sheet metal tube 138 by a respective fastener 147. The position of the each second guide 142 can thus be adjusted to compensate for wear by sliding contact with the helical member 102 by adjusting the respective fastener 147.

In the operation of the apparatus 100, the helical member 102 is driven by the motor 114 to rotate around the axis X. Each garment (not shown) supported on a respective hanger H is conveyed one at a time by the indexing device 130 onto the first portion 105. The hangers H exit the indexing device 130 one at a time with the plane of each hanger H oriented in a first position substantially perpendicular to the axis X of the helical member 102, and fall from the indexing device 130 onto the helical member. As explained above, the hooked end of each hanger H initially straddles the helical member 102 and entrance spring 132 in the first position. As each hanger H is conveyed in the direction of the arrow in FIG. 5, the spring guide 132 contacts and, in turn, urges each hanger into contact with the leading edge 133 of the first hanger guide 134. The hanger H is then rotated from the first position into the second position so that the plane of the hanger is nearly parallel to the axis X of the helical member 102. Then, as the hanger H is conveyed forward against the leading edge 133, the spring guide 132 is deflected a slight amount, permitting the hanger to slide past the leading edge and into the slot 136. The first and second hanger guides 134 and 135 then maintain each hanger H in the second position as it travels through the slot 136 along the helical member 102.

In the first portion 105 of the helical member 102, each hanger H moves at a relatively slow speed due to the relatively small pitch P1 of the helical member 102. The relatively small diameter D1 of the helical member 102 in the first portion 105 also facilitates loading of the hangers H onto the helical member. The small pitch P1 and, thus, the slow hanger speed is maintained until the hanger H passes a scan window 148 of a scanning device of a type known to those skilled in the art. Preferably, each garment (not shown) includes a bar code label with identifying indicia for the respective garment coded on the label. Therefore, as each hanger H and respective garment is conveyed past the scan window 148, the scanning device can read the respective bar code label. The slower speed of the hangers H within the first portion 105 thus facilitates the ability of the scanning device to read the bar code labels.

After each hanger H passes the scan window 148, the pitch of the helical member 102 increases within the second transition portion 107 and, thus, the speed of the hanger H correspondingly increases. The diameter of the helical member 102 also increases within the second transition portion 107 from the diameter D1 of the first portion 105 to the diameter D2 of the second portion 109. The increased diameter creates a greater clearance at the driving end 106 and facilitates the discharge of the hangers H onto, for example, a feed rod (not shown) located below the J-hook 108. Each hanger H is then conveyed to the driving end 106 of the helical member 102, and as the J-hook 108 rotates upward, each hanger H falls off the driving end 106 of the helical member and onto the feed rod (not shown) located below. The feed rod then conveys each hanger H onto a loading device 150 (encircled by dashed lines) for loading the hangers onto a sorting conveyor (not shown). The loading device 150 can be, for example, the same as that shown and described in co-pending U.S. patent application Ser. No. 07/643,857, filed Jan. 22, 1991.

As will also be recognized by those skilled in the art, the apparatus and method of the present invention can be readily adapted for conveying any of numerous types of hooked members supporting articles, for rotating the hooked members and articles from one position into another while being conveyed, and for varying the speed of travel of the hooked members during conveying to facilitate viewing the articles, and particularly to scan bar code labels, for example, attached to the articles.

We claim:

1. An apparatus for conveying articles supported on hooked members comprising
    a helical member for supporting and conveying the hooked members upon being rotated, including a first portion for conveying the hooked members at a first speed and a second portion for conveying the hooked members at a second speed; and
    a guide member supported adjacent to the helical member for rotating each hooked member from a first position into a second position oriented at a angle relative to the first position, wherein the guide member defines a slot extending therethrough and adapted to receive each hooked member and to maintain each hooked member in the second position upon being conveyed therethrough along at least a portion of the conveying member.

2. An apparatus as defined in claim 1, wherein the helical member further includes a third portion between the first and second portions for gradually changing the speed of the hooked members from the first speed to the second speed upon conveyance by the helical member.

3. An apparatus as defined in claim 1, wherein the speed of conveyance within the first and second portions of the helical member is controlled by selecting the pitch of the helical member within the respective portion.

4. An apparatus as defined in claim 1, wherein the speed of conveyance within the first and second portions of the helical member is controlled by selecting the pitch and outer diameter of the helical member within the respective portion.

5. An apparatus as defined in claim 1, wherein the first portion of the helical member defines a first pitch and first diameter corresponding to the first speed of conveyance and the second portion defines a second pitch and second diameter corresponding to the second speed of conveyance.

6. An apparatus as defined in claim 2, wherein the pitch and diameter of the third portion change in a substantially linear manner for gradually changing the speed of the hooked members from the first speed to the second speed.

7. An apparatus as defined in claim 1, further comprising a flexible guide bar disposed below the guide member for contacting each hooked member upon being received by the helical member and facilitating the rotation of each hooked member from the first position into the second position upon contacting the guide member.

8. An apparatus as defined in claim 1, wherein the first speed is slower than the second speed and, wherein a scanning device is located adjacent to the first portion and the first speed is selected for scanning the articles supported by the hooked members upon conveyance by the first portion of the helical member.

9. An apparatus as defined in claim 1, whereupon in the first position a plane of each hooked member is oriented substantially perpendicular to the axis of the helical member and in the second position the plane of each hooked member is oriented substantially parallel to the axis of the helical member.

10. An apparatus for conveying articles supported on hooked members comprising:

a conveying member including a first portion for conveying the hooked members at a first speed, a second portion for conveying the hooked members at a second speed and a third portion for gradually changing the speed of the hooked members from the first speed to the second speed, the third portion being located between the first and second portions, and wherein the second speed is greater than the first speed;

a guide member for rotating each hooked member from a first position into a second position oriented at an angle relative to the first position for conveyance by the conveying member in the second position, wherein the guide member includes a first guide portion and a second guide portion spaced apart from the first guide portion such that a slot is formed between the first and second guide portions so that the first guide member contacts each hooked member and rotates each hooked member from the first position into the second position and wherein the first and second guide members act to receive and maintain each hooked member in the second position upon conveyance of the respective hooked member by the conveying member.

11. An apparatus as defined in claim 10, wherein the pitch of the third portion changes in a substantially linear manner for gradually changing the speed of the hooked members from the first speed to the second speed.

12. An apparatus as defined in claim 10, wherein the conveying member includes a rotatably mounted helical member for conveying the hooked members upon rotation of the helical member.

13. An apparatus as defined in claim 12, wherein the first portion defines a first pitch within the helical member for conveying the hooked members at the first speed, the second portion defines a second pitch within the helical member for conveying the hooked members at a second speed, and wherein the third portion defines a pitch which gradually changes from the first pitch to the second pitch.

14. An apparatus as defined in claim 12, wherein the first portion defines a first diameter of the helical member corresponding to the first speed of conveyance and the second portion defines a second diameter of the helical member corresponding to the second speed of conveyance.

15. An apparatus as defined in claim 10, further comprising a flexible guide bar for contacting each hooked member upon being received by the conveying member and facilitating the rotation of each hooked member from the first position into the second position upon contacting the guide member.

16. An apparatus as defined in claim 10, wherein a scanning device is located adjacent to the first portion and wherein the first speed is selected for scanning the articles supported by the hooked members upon conveyance by the first portion of the conveying member.

17. An apparatus as defined in claim 10, wherein in the first position a plane of each hooked member is oriented substantially parallel to an axis of the conveying member and in the second position the plane of each hooked member is oriented substantially perpendicular to the axis of the conveying member.

18. An apparatus for conveying articles supported on hooked members, comprising:

a conveying member for supporting and conveying the hooked members, including a first portion for conveying the hooked members at a first sped and a second portion for conveying the hooked members at a second speed; and a positioning member supported adjacent to the conveying member for rotating each hooked member from a first position into a second position oriented at an angle relative to the first position upon conveyance by the conveying member, wherein the positioning member defines a slot extending therethrough and adapted to receive each hooked member and to maintain each hooked member in the second position upon being conveyed therethrough along at least a portion of the conveying member.

19. An apparatus as defined in claim 18, wherein conveying member includes a substantially helical surface for receiving and supporting the hooked members, and means for rotating the helical surface for conveying the hooked members upon rotation of the helical surface.

20. An apparatus as defined in claim 19, wherein the first portion is defined by a first pitch within the helical surface for conveying the hooked members at the first speed, and the second portion is defined by a second pitch within the helical surface for conveying the hooked members at the second speed.

21. A method of conveying hooked members supporting articles, comprising the steps of:

conveying each hooked member on a conveying member at a first speed;

scanning the article supported on the hooked member; and conveying the hooked member at a second speed, wherein the second speed is greater than the first speed, along at least a portion of the conveying member, wherein a guide member is positioned adjacent to the conveying member so that it contacts the hooked members supported on the conveying member, the guide member being adapted to rotate each hooked member from a first position into a second position oriented at an angle relative to the first position, and wherein the guide member includes a first guide portion and a second guide portion spaced apart from the first guide portion such that a slot is formed between the first and second guide portions so that the first guide member contacts each hooked member and rotates each hooked member from the first position into the second position and wherein the first and second guide members act to receive and maintain each hooked member in the second position upon conveyance of the respective hooked member by the conveying member.

* * * * *